United States Patent [19]
Sol

[11] 3,786,528
[45] Jan. 22, 1974

[54] APPARATUS AND METHOD FOR MANUFACTURING WELD NUTS

[76] Inventor: Jack Sol, 28539 Trvistock Trl., Southfield, Mich. 48075

[22] Filed: Oct. 24, 1972

[21] Appl. No.: 299,742

[52] U.S. Cl. .............................. 10/76 R, 10/86 CL
[51] Int. Cl. ......................... B21d 53/24, B21j 5/12
[58] Field of Search . 10/76 R, 72 CN, 86 F, 86 CL, 10/85; 85/32 WE

[56] References Cited
UNITED STATES PATENTS

| | | | |
|---|---|---|---|
| 2,074,678 | 3/1937 | Wilcox .............................. | 10/76 R |
| 2,226,399 | 12/1940 | Frayer et al. ...................... | 10/76 R |
| 2,408,793 | 10/1946 | Mason ................................ | 10/85 |
| 2,814,812 | 12/1957 | Stern ................................. | 10/76 R |
| 3,045,735 | 7/1962 | Kern ................................... | 10/85 |
| 3,045,736 | 7/1962 | Howe ................................ | 10/86 CL |
| 3,382,516 | 5/1968 | Westbay .......................... | 10/76 R |
| 3,505,697 | 4/1970 | Westbay .......................... | 10/72 CN |

Primary Examiner—Charles W. Lanham
Assistant Examiner—E. M. Combs
Attorney, Agent, or Firm—Andrew R. Basile et al.

[57] ABSTRACT

An apparatus for manufacturing a weld nut by the application of pressure to a standard nut blank. The apparatus has reciprocally mounted and axially aligned upper and lower die members between which an axial pressure is applied to the nut blank to form the weld nut. A cutting die carried by and movable with one of die members has a central aperture through which the other die member and nut blank pass during the pressure-applying stroke. The aperture is so sized with respect to the nut blank that the same, during lateral and axial deformation thereof, becomes snuggly disposed within the upper portion of the aperture and is retained therein during the separation of the upper and lower die members. A knockout pin carried by the movable die member engages the upper surface of the deformed nut blank to eject the same through the cutting die aperture and remove all lateral deformations such that the resulting weld nut has overall dimensions which are substantially the same as the original dimensions of the nut blank. A method for fabricating the weld nut is also disclosed.

8 Claims, 10 Drawing Figures

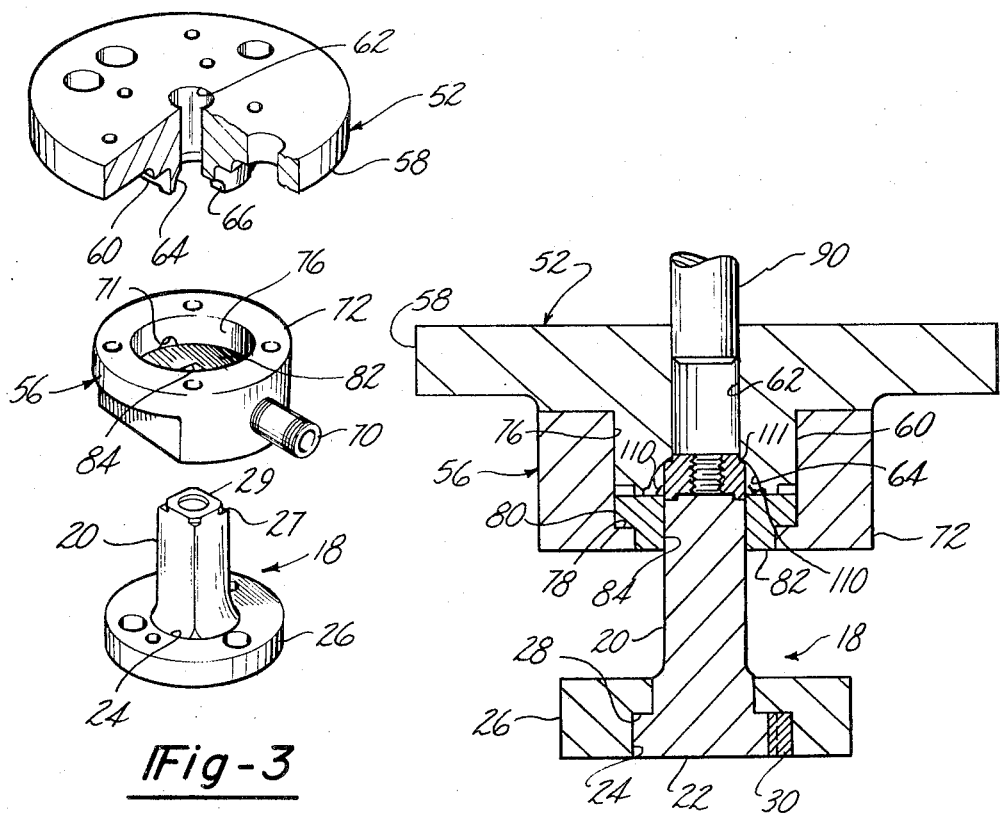
Fig-3
Fig-4
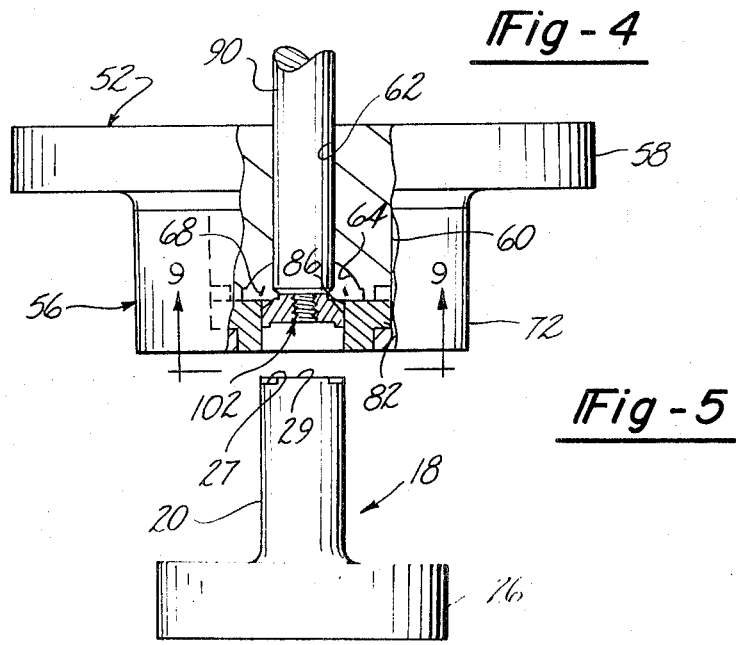
Fig-5

APPARATUS AND METHOD FOR MANUFACTURING WELD NUTS

BACKGROUND OF THE INVENTION

I. Field of the Invention

The present invention relates generally to the field of fasteners and connecting elements and, in particular, to an apparatus and method of forming and producing weld nuts and the like.

II. Background of the Invention

Weld nuts are well known and are generally used in conjunction with a sheet metal which is too thin to have a threaded bore formed therein for the reception of a threaded screw to fasten the sheet metal to another element. Generally, weld nuts are fabricated from a substantially square nut blank, the same being deformed to form axially displaced welding projections having flat bottom surfaces with the weld nut being positioned on one side of the sheet metal and welded thereon by conventional means. An aperture in the sheet metal permits the passage of a threaded screw which engages the weld nut for securing of the sheet metal in the desired manner.

Various methods and apparatus for forming or producing weld nuts have heretofore been employed and in certain types of applications the weld nuts produced by many of the known methods and apparatus are very satisfactory. However, most weld nuts cannot be used in standard hopper feeding equipment or the like because the overall dimensions of the finished weld nut exceeds the original dimensions of the standard nut blank. Improved method for forming a weld nut wherein the dimensions of the weld nut do not exceed the original dimensions of the standard nut blank are also disclosed in the prior art as, for example, in U.S. Pat. Nos. 3,045,735 and 3,045,736. However, the methods so disclosed require complicated and expensive apparatus to achieve this end. In particular, the apparatus employed in the aforementioned patents require means which, during the deformation of the standard nut blank, restrain lateral deformation of the nut so that it will not flow beyond the side faces of the original dimensions of the standard nut.

It would thus be desirable to provide an apparatus and method for the manufacture of weld nuts from a standard nut blank which results in a weld nut having overall dimensions that do not exceed the original overall dimensions of the standard nut blank, but one which is less expensive and less complicated than the apparatus and methods heretofore employed.

SUMMARY OF THE INVENTION

The present invention which will be subsequently described in greater detail comprises an apparatus and method for manufacturing a finished weld nut by the application of axial pressure to a standard nut blank to cause axial and lateral deformation of the standard nut blank. Means are included for axially cutting the lateral deformations of the deformed nut blank such that the resulting finished weld nut has overall dimensions that do not exceed the original dimensions of the standard nut blank.

It is therefore a primary object of the invention to provide a new and improved apparatus and method for making fasteners and connectors and, in particular, for making weld nuts.

It is also an object of the present invention to provide an apparatus and method for the fabrication of weld nuts by means of the deformation of a standard nut blank while at the same time the resulting weld nut will have overall dimensions that do not exceed the overall dimensions of the standard nut blank.

Other objects, advantages and applications of the present invention will become apparent to those skilled in the art of apparatus and methods for manufacturing fasteners, connectors, and weld nuts when the accompanying description of one example of the best mode contemplated for practicing the invention is read in conjunction with the accompanying drawings.

BRIEF DESCRIPTION OF THE DRAWINGS

The desccription herein makes reference to the accompanying drawings wherein like numerals refer to like components throughout the several views and in which:

FIG. 3 is a fragmentary, partially sectioned, exploded perspective view of certain elements of the weld nut fabricating apparatus illustrated in FIGS. 1 and 2;

FIG. 4 is a fragmentary cross-sectional view of the weld nut fabricating apparatus taken along line 4—4 of FIG. 1 with the assembly being shown in the press position.

FIG. 5 is a fragmentary cross-sectional view of the weld nut fabricating apparatus similar to FIG. 4 with the assembly being shown partially ejecting a finished weld nut.

DESCRIPTION OF THE PREFERRED EMBODIMENT

Figure 1:
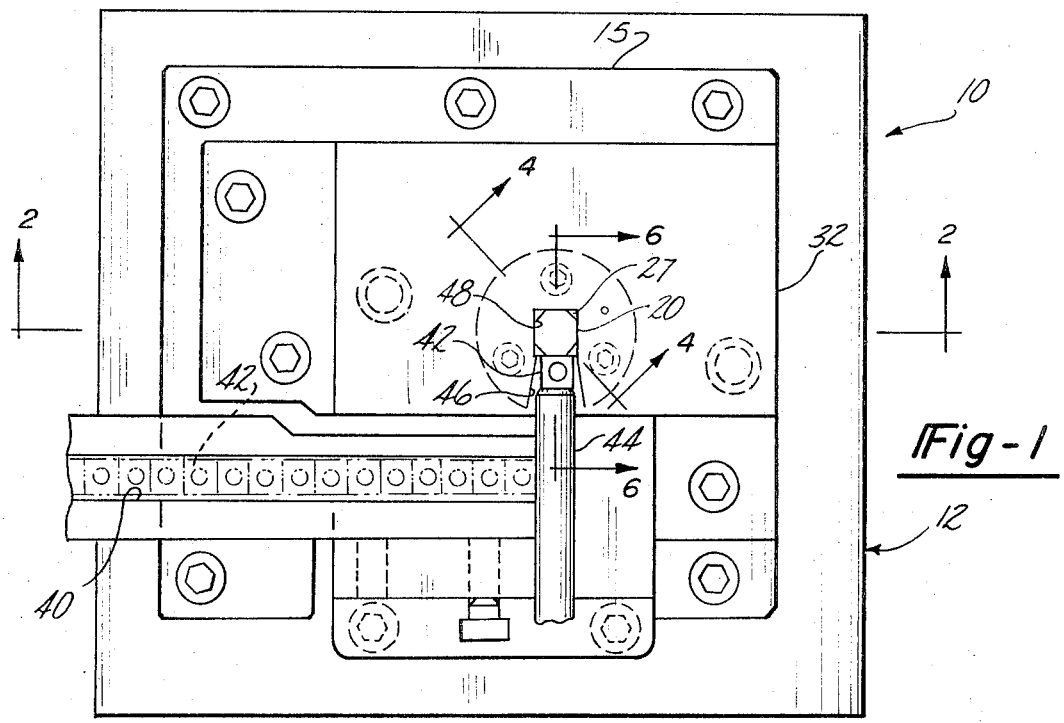
FIG. 1 is a fragmentary elevational view of a weld nut fabricating apparatus constructed in accordance with the principles of the present invention as seen from line 1—1 of FIG. 2.
Figure 2:
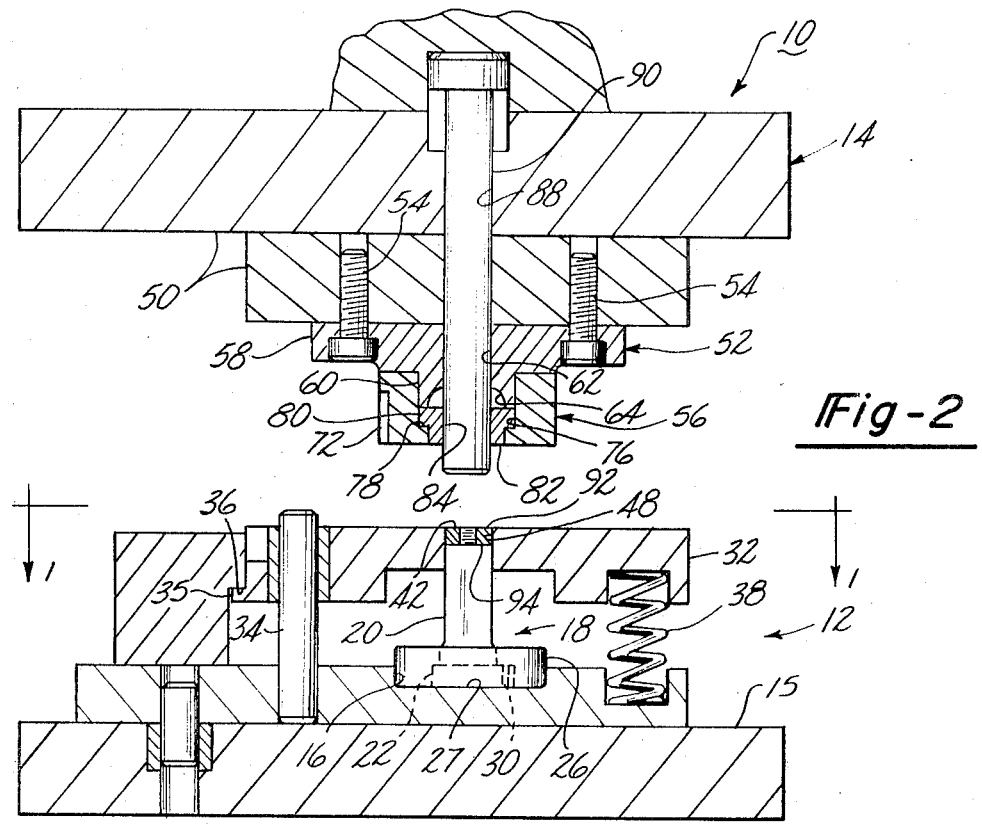
FIG. 2 is a fragmentary cross-sectional view of a weld nut fabricating apparatus taken along line 2—2 of FIG. 1.
Figure 10:
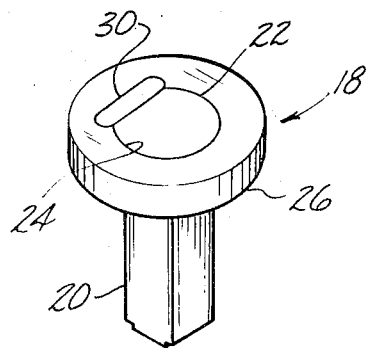
FIG. 10 is an inverted perspective view of the lower die member illustrated in FIG. 3.
Figure 9:
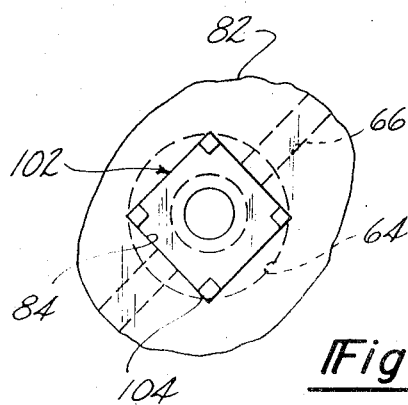
FIG. 9 is a fragmentary view of the weld nut fabricating apparatus as seen from line 9—9 of FIG. 5.

Referring to FIGS. 1 through 3 of the drawings, there is shown one example of the present invention in the form of a reciprocating die mechanism or apparatus 10 having a stationary lower die support table 12 and a reciprocally movable upper die support table 14. The lower die support table 12 comprises mounting plates 15 which, in turn, form a stationary portion of the die press 10. The upper most surface of the mounting plates 15 has a recess 16 within which a lower die assembly 18 is snuggly secured by any suitable fastener such as screws (not shown). As can best be seen in FIGS. 3, 4, and 10, the lower die assembly comprises a die post 20 having an enlarged end portion 22. The die post 20 is axially received in a bore 24 of a base section 26, the bore 24 having a shoulder 28 which is engaged by the enlarged end portion 22 of the die post 20.

The shoulder 28 limits the axial inward movement of the die post 20 while a key 30 inserted between the bore 24 and the outer periphery of the end portion 22 prevents relative rotational movement between the die assembly base section 26 and the die post 20. The downward axial movement of the die post 20 from within the die base 26 is restrained by the abutment of the bottom surface of the die post 20 with the bottom wall 27 of the mounting plate recess 16. Thus, as will be seen hereinafter during a description of the operation of the die press 10, forces, transmitted from the upper die to the die post 20 in order to apply an axial pressure to a standard nut blank, are transmitted directly from the die post 20 to the mounting plastes 15. As can best be seen in FIG. 3, the lower die post 20 has a plurality of recesses 27 from on its upper face to provide a center supporting face 29.

The lower die support table 12 further comprises a blank locator plate 32 reciprocally mounted on a plurality of guide post, one of which is shown at 34. The blank locator plate 32 has a shoulder 35 which engages a stop 36 carried by the support table 12 and which functions to limit the upward movement of the blank locator plate 32 under the force of a plurality of coil springs, one of which is shown at 38.

As can best be seen in FIGS. 1 and 2, the die press 10 further comprises an automatic feed hopper 40 which supplies standard nut blanks 42 to a feeder finger 44. The finger 44 is laterally spaced from a slot 46 within the blank locator plate 32, the slot 46 terminating in a three-sided pocket 48 which is axially aligned with the die post 20. The pocket 48 receives a nut blank 42 when the feeder finger 44 is reciprocally actuated in a time relationship to the cycle of the die press 10 in a manner to be more specifically described.

Referring now to FIGS. 2, 3, 4 and 6, the upper die support table 14 comprises support plates 50 having an upper die assembly 52 mounted to the bottom surface of the plates 50 by any suitable means, such as fastening screws 54. A cutter die assembly 56 is, in turn, fastened to the upper die assembly 52 by any suitable fastener or the like (not shown).

Figure 6:
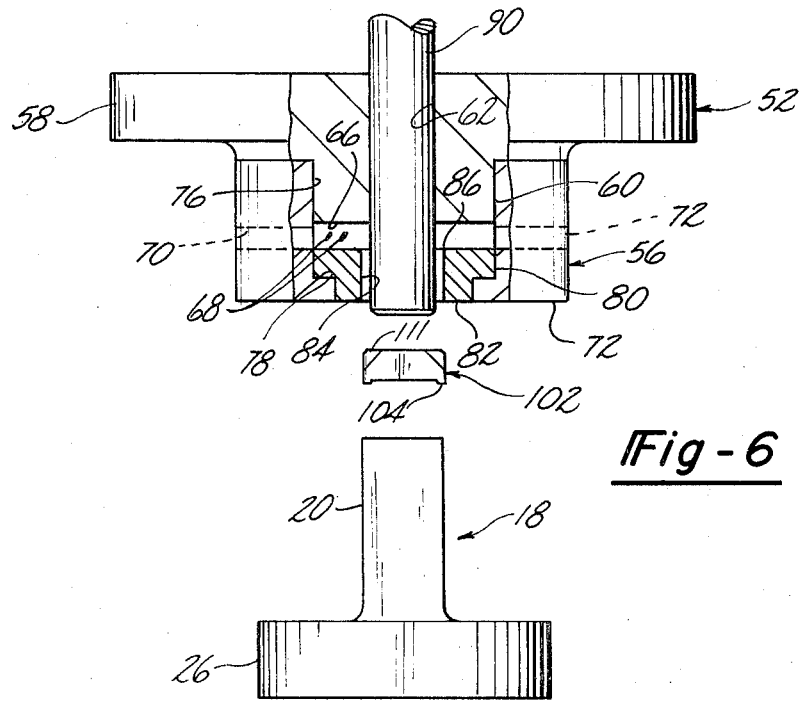
FIG. 6 is a fragmentary cross-sectional view of the weld nut fabricating apparatus taken along line 6—6 of FIG. 1 with the assembly being shown ejecting a finished weld nut.

The upper die assembly 52 (FIGS. 3, 4 and 6) comprises a cylindrical base section 58 having a downwardly extending hub portion 60. The base 58 and hub 60 have an axial bore 62 that terminates in a hemispherically shaped forming die face 64 and a laterally extending bore 66 (FIG. 6). The lateral bore 66, as will be explained hereinafter, accumulates metal scrap chippings 68 removed from the nut blank 42 after the same has been deformed into a welding nut and the scrap chippings 68 are discharged from the lateral bore 66 by means of a vacuum supply port 70 which is, in turn, connected to any suitable vacuum generating source and scrap-holding container. The opposite end of the lateral bore 66 is connected to an air-intake port 71.

The cutter die assembly 56 comprises a cylindrical member 72 having a step bore 76 forming a shoulder 78 on which is seated the enlarged head 80 of a cutter die 82. The cutter die 82 has an aperture 84 extending completely therethrough in axial alignment with the lower die post 20 and through which the die post 20 extends when the upper die support table 14 is lowered during a compression cycle of the die press 10. The upper peripheral edge 86 of the aperture 84 forms a cutting edge adapted to trim a deformed nut blank 42 in a manner which will be described in detail hereinafter.

The upper die support table 14 has an axial bore 88 which is axially aligned with the upper die bore 62. The axial bore 88 slidably supports a knockout pin 90., the operation of which will likewise be explained hereinafter in the description of the operation of the die press 10.

Figure 7:
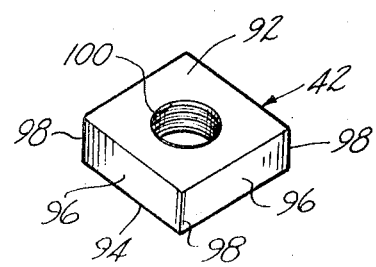
FIG. 7 is a perspective view of a standard nut blank.

Referring to FIG. 7 there is illustrated a standard nut blank 42 having generally flat, parallel, square upper and lower end surfaces 92 and 94, respectively, of equal area, intersecting generally flat side surfaces 96, corners 98, and a centrally disposed threaded bore 100, the axis of which is generally normal to the surfaces 92 and 94. Nut blanks 42 of this type are conventional and readily obtainable in gross lots on the open market and are relatively inexpensive.

Figure 8:
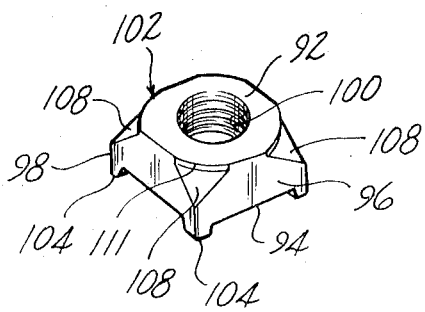
FIG. 8 is a perspective view of a finished weld nut having welding projections formed at its corners.

In FIG. 8 there is illustrated a finished weld nut 102 having generally flat end surfaces 92 and 94, and intersecting side surfaces 96. Welding projections 104 are formed at the corners 98 so that they extend axially beyond the lower end surface 94 a distance equal to the depth of the recesses 27. Four sloped surfaces 108 at the corners 98 of the weld nut 102 are formed by the engagement of the die face 64 with the nut blank surface 92. The upper ends of the sloped surfaces 108 terminate in a cylindrical portion 111 formed by engagement with the die bore 62 during the axial compression of the nut blank 42 between the upper and lower dies.

In operation, standard nut blanks 42 are fed through the automatic hopper feeder 40 to the finger 44 which upon proper actuation, either electrically, pneumatically or hydraulically, as desired, in timed relation to the cycle of the press 10 transfers a standard nut blank 42 to within the three-sided pocket 48 of the locator plate 32 such that the lower flat end surface 94 is supported at the upper supporting face 29 of the die post 20 with the corners 98 of the nut blank 42 being disposed over the localized recessed areas 27. Thus the standard nut blank 42 is accurately positioned in proper axial alignment with the cutting die aperture 84 through which the same is fed during the compression cycle of the die press 10. Upon removal of the finger 44, the press 10 is actuated to lower the upper die support table 14 toward the lower die support table 12. As the upper die support table is so lowered, the bottom wall of the cutter die assembly 56 engages the locator plate 32 and lowers the same against the bias of the springs 38 while at the same time the standard nut blank 42 and the die post 20 are received axially upwardly through the cutter die aperture 84 until the die press 10 is in the fully pressed position as illustrated in FIG. 4. In the press position an axial pressure is applied to the lower end surfaces 94 of the nut blank and the corners 98 compressively engage the hemispherically shaped die surface 64 of the upper die to axially displace the corners 98 downwardly into the recessed portions 27 of the die post 20 to form the aforementioned welding projections 104. It should also be noted that the axial compression of the nut blank 42 produces a lateral deformation as shown at 110 in FIG. 4. It should further be noted that as the welding projections 104 are produced, the lower portions thereof are partially restrained from such lateral deformation by abutment with the wall of the cutting die aperture 84 and such partially restrained lateral deformation snuggly secures the deformed nut within the upper end of the die aperture 84. The next cycle of operation of the press results in the separation of the upper and lower dies. As can be seen in FIG. 5 as the upper die is reciprocally moved upwardly away from the lower die, and as the lower die post 20 is withdrawn from the die aperture 84, the nut remains at the upper end of the die aperture 84 until the relatively downward-movinv knockout pin 90 abuts with the upper end surface 92 of the formed weld nut to drive the same downwardly past the cutting edges 86 whereby the lateral deformations 110 are removed by the upper cutting edge of the die assembly 56. At the same time the vacuum source functions to move the metal shavings 68 from the lateral bore 66 within the upper die assembly to carry the same to a suitable waste container.

In FIG. 6 the die press 10 is illustrated in its fully separated position with the knockout pin 90 extended completely through the cutting die aperture 84 and the finished weld nut 102 ejected from the upper die. Since the lateral deformations 110 have been removed, the overall dimensions of the finished weld nut side surfaces do not exceed the original dimensions of the side surfaces of the standard nut blank. Thus the finished weld nut is usable in a standard hopper for feeding equipment which may subsequently use the finished weld nut. A source of air pressure (not shown) operable in timed relation to the ejection cycle of the die press 10 directs the falling ejected weld nuts 102 to a suitable storage container.

The die post 20 may be removed from the die assembly base section 26 simply by removing the key 30 and the die post 20 may be replaced with a second die post having different dimensions to accommodate varying sized nut blanks while at the same time the cutter die assembly 56 and the upper die 64 are also removable and replaceable by dies of a proper size corresponding to the nut blank to be deformed all of which provides an apparatus which very easily and inexpensively may be converted for the manufacture of weld nuts of varying dimensions.

It can thus be seen that the present invention provides an extremely simple apparatus and method for manufacturing finished weld nuts from standard nut blanks with the finished weld nuts being usable in standard hopper feeding equipment as the overall dimensions of the finished weld nut does not exceed the overall dimension of the standard nut blank. All of this is accomplished by having a cutter die carried by and movable with an upper die to remove lateral deformations from the deformed nut during ejection of the welding nut from the upper die assembly.

Although only one form of the present invention has been disclosed, it should be understood by those skilled in the art of manufacturing weld nuts that other forms may be had all coming within the spirity of the invention and scope of the appended claims.

What is claimed is as follows:

1. A method of manufacturing a weld nut by the application of pressure to a standard nut blank of the type having substantially parallel flat end surfaces and generally flat side surfaces intersecting each other to form corners and wherein said side surfaces are normal to said end surfaces, said method comprising the steps of:
supporting one end surface of said blank except for localized areas adjacent and under said corners of said one end surface;
moving said blank while so supported through a complementary apertured cutting die so sized with respect to said blank that the same will pass therethrough without effecting a cutting operation thereon;
uniformly applying axial pressure against the end surfaces of said blank to displace said corners of said one end surface axially beyond said one end surface and laterally of said side surfaces to form axially disposed welding projections at the periphery of said nut blank;
discontinuing the applied axial pressure; and
applying a second axial pressure to the other of said end surfaces to drive said deformed blank through said cutter die aperture to remove said lateral deformations such that the resulting weld nut ejected through said apertured cutting die has side surfaces that are normal to the original planes of said end surfaces and without substantial lateral deformation from the original dimensions of said side surfaces.

2. The method of manufacturing a weld nut as defined in claim 1 wherein said supported end surface of said blank is disposed within a portion of said cutting die aperture during said first-mentioned application of axial pressure to said blank end surfaces whereby a portion of the lateral deformation of said blank engages the walls of said cutting die aperture to lock said blank nut within said cutting die aperture.

3. A press for manufacturing weld nuts by the application of pressure to a standard nut blank of the type having substantially parallel flat end surfaces and generally flat side surfaces intersecting each other to form corners and wherein said side surfaces are normal to said end surfaces; said press comprising:
a pair of die members movable relative to each other;
a cutting die disposed between said die members, said cutting die having an aperture shaped complementary to said blank side surfaces and aligned with said die members such that one of said die members is relatively reciprocally movable therethrough, said one die member having a blank support surface for supporting thereon one of said end surfaces of said nut blank, said support surface having localized recesses in areas adjacent and under the corners of said one supported blank end surface;
means for moving said die members toward each other with said one die member moving in one direction into said cutting die aperture for applying an axial pressure on said end surfaces to axially deform the corners of said blank into said recessed areas of said one die member to form axially disposed welding projections at the periphery of said nut blank and laterally displacing a portion of said side wall corners with a portion thereof engaging the walls of said aperture;
means separating said die members with said one die member moving in an opposite direction for withdrawal from said cutting die aperture while said blank remains in engagement with said cutting die aperture walls; and
means engaging the other of said blank end surfaces for displacing said blank through said cutting die aperture to effect a cutting operation thereon to remove said lateral deformations such that the resulting weld nut ejected from said cutting die aperture has side surfaces that are normal to the original planes of said end surfaces and without substantial lateral deformation from the original dimensions of said side surfaces of said blank.

4. The press for manufacturing weld nuts as defined in claim 3 wherein said cutting die is carried by said other die member and movable therewith toward said one die member.

5. The press for manufacturing weld nuts as defined in claim 3 wherein said blank is supported on said one die member and carried thereby through said aperture into engagement with said other die member.

6. A press for manufacturing weld nuts by the application of pressure to a standard nut blank of the type having substantially parallel flat end surfaces and side surfaces intersecting each other to form corners and wherein said side surfaces are normal to said end surfaces, said press comprising:
   a lower die member having a nut blank supporting surface with localized areas of the supporting surface being recessed and disposed under the corners of said nut blank when the same is supported on said lower die member;
   an upper die member reciprocally movable to and from said lower die member and adapted to engage the other end surface of said blank for applying an axial pressure on said blank to axially displace the corners of said blank into said recessed areas on said lower die member and laterally displace portions of said side wall corners;
   an intermediate die member having a cutting aperture and disposed between said upper and lower die members in axial alignment therewith, said intermediate die member being carried by and movable with said upper die member, said cutting die aperture being complementary to the side surfaces of said blank such that said blank and lower die member pass therethrough as said upper die member moves toward said lower die member to apply said aforementioned axial pressure, said laterally displaced portions of said blank corners partially engaging said aperture such that upon separation of said upper and lower die members said blank is maintained within the upper portion of said aperture; and
   means operable upon separation of said upper and lower die members for engaging the upper end surface of said blank to drive said blank through said cutting aperture to remove said laterally displaced portions from said blank such that the resulting weld nut has side surfaces that are normal to the original planes of said end surfaces and without substantial lateral deformation from the original dimensions of said blank side walls.

7. The press for manufacturing weld nuts as defined in claim 6 further comprising:
   an upper die member support on which said upper member is reciprocally carried for movement to and away from said lower die member;
   a tubular member carried by said upper die member and circumscribing said upper die member, said tubular member extending beyond said upper die member and carrying said intermediate die members, said tubular member having a bore with a surface complementary to the outer peripheral surface of said intermediate die member for supporting same, said intermediate die member being removably attached thereto, whereby said intermediate die member may be replaced by other intermediate die members having varying sized cutting apertures to accommodate the manufacture of weld nuts of different dimensions.

8. The press for manufacturing weld nuts as defined in claim 6 further comprising a lower die member support, said lower die member support fixedly mounting said lower die member in axial alignment with said die cutter aperture, said lower die member comprising:
   a post member for having an englarged lower end;
   a mounting base having a step bore through which said post member is insertable, said step bore engaging said enlarged end of said post member; and
   means engageable between said enlarged end and said base bore for preventing relative rotation between said post member and said base, said post member being supported directly on the surface of said lower die support member to transmit forces from said upper die member directly to said lower die member.

\* \* \* \* \*